United States Patent
Clark et al.

(10) Patent No.: US 11,233,787 B2
(45) Date of Patent: Jan. 25, 2022

(54) AUTOMATED ON CALL AND AD HOC ACCESS TO RESTRICTED RESOURCES

(71) Applicant: salesforce.com, inc., San Francisco, CA (US)

(72) Inventors: LaDean Clark, Redwood City, CA (US); Ramesh Ramani, Sunnyvale, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 172 days.

(21) Appl. No.: 16/779,247

(22) Filed: Jan. 31, 2020

(65) Prior Publication Data
US 2021/0243183 A1 Aug. 5, 2021

(51) Int. Cl.
| | |
|---|---|
| *H04L 29/06* | (2006.01) |
| *H04L 12/58* | (2006.01) |
| *H04L 12/46* | (2006.01) |
| *H04W 84/18* | (2009.01) |

(52) U.S. Cl.
CPC ...... *H04L 63/0846* (2013.01); *H04L 12/4641* (2013.01); *H04L 51/04* (2013.01); *H04L 63/20* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |

(Continued)

OTHER PUBLICATIONS

"Google Plus Users", Google+Ripples; Oct. 31, 2011; 3 pages.

*Primary Examiner* — Cai Y Chen
(74) *Attorney, Agent, or Firm* — Schwabe Williamson & Wyatt

(57) ABSTRACT

Complex cloud-based system with many different entities, e.g., servers, clients, databases, firewalls, other machines, etc. often require on call engineers to be available to help with maintenance, emergencies, and other tasks. Sometimes ad hoc access is required when on call engineers are unable to resolve a particular issue. Organizations that manually manage access to on call and ad hoc engineer access, may do so relatively easily if they are a smaller organization. But, for larger or more complex environments, manual processes represent a significant burden. An alternative is automatically grant and revoke access. For example, if a vendor tracks your on call engineers, on call statuses may be identified to automatically grant access while on call. For ad hoc access, a requestor may request temporary access, and if valid, access may also be automatically granted for a desired time period. Automation frees valuable limited resources for other tasks.

20 Claims, 6 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |

(56) References Cited

U.S. PATENT DOCUMENTS

| | | |
|---|---|---|
| 2009/0100342 A1 | 4/2009 | Jakobson |
| 2009/0177744 A1 | 7/2009 | Marlow et al. |
| 2011/0218958 A1* | 9/2011 | Warshavsky ............ G06N 5/00 |
| | | 706/54 |
| 2011/0247051 A1* | 10/2011 | Bulumulla ............. G06F 21/00 |
| | | 726/4 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1* | 9/2013 | Cinarkaya ............... G06F 21/60 |
| | | 726/27 |
| 2014/0359537 A1 | 12/2014 | Jackobson et al. |

* cited by examiner

AUTOMATED ON CALL AND AD HOC ACCESS TO RESTRICTED RESOURCES

TECHNICAL FIELD

The present invention relates generally to computing systems, and more particularly to using a chat service to help automate granting and removing access to network resources.

BACKGROUND

A large-scale cloud-based computer system may include multiple datacenters at various geographic locations to maintain millions of sets of application data for millions of organizations as well as provide millions of sets of application services such as those for customer relationship management, secured data access, online transaction processing, mobile apps, etc., to respective users and/or customers of these organizations. As datacenters grow, evolve and interconnect over time, and as computing resource needs for the organizations evolve over time, networks interconnecting devices continue to grow ever larger and more complex. In current network environments there may be many thousands of interconnected devices, such as client devices, servers, hubs, switches, routers, etc.

Maintaining an organization's network and computing devices is complex, especially as a network may contain many different hardware and software entities, such as data centers, servers, clients, mobile devices, Internet of Things (IoT) machines, etc. Accessing the network may be managed by firewalls, positioned at network edges or perimeters separating "internal" resources from "external" entities/sources. Because malicious actors relentlessly attack networks, it is important to restrict access to the networks. Firewalls may be configured to monitor data traffic crossing the network boundary, and when deemed safe (i.e., trusted), it is allowed to progress through the firewall to the internal network.

Organizations may employ various entities to assist with maintenance. For example, in a given time period, engineers may be put "on call" so that they may assist with problems, if any, that arise during their time on call. In some circumstances, "ad hoc" support may be needed to get a specific resource, such as a particular type of engineer, available to assist with a problem. Typically, the organization has a security department that reviews, and if ok, grants on call or ad hoc security clearance to enable the desired support. And, the security department needs to remember to revoke the access when no longer needed. This can be a burden.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
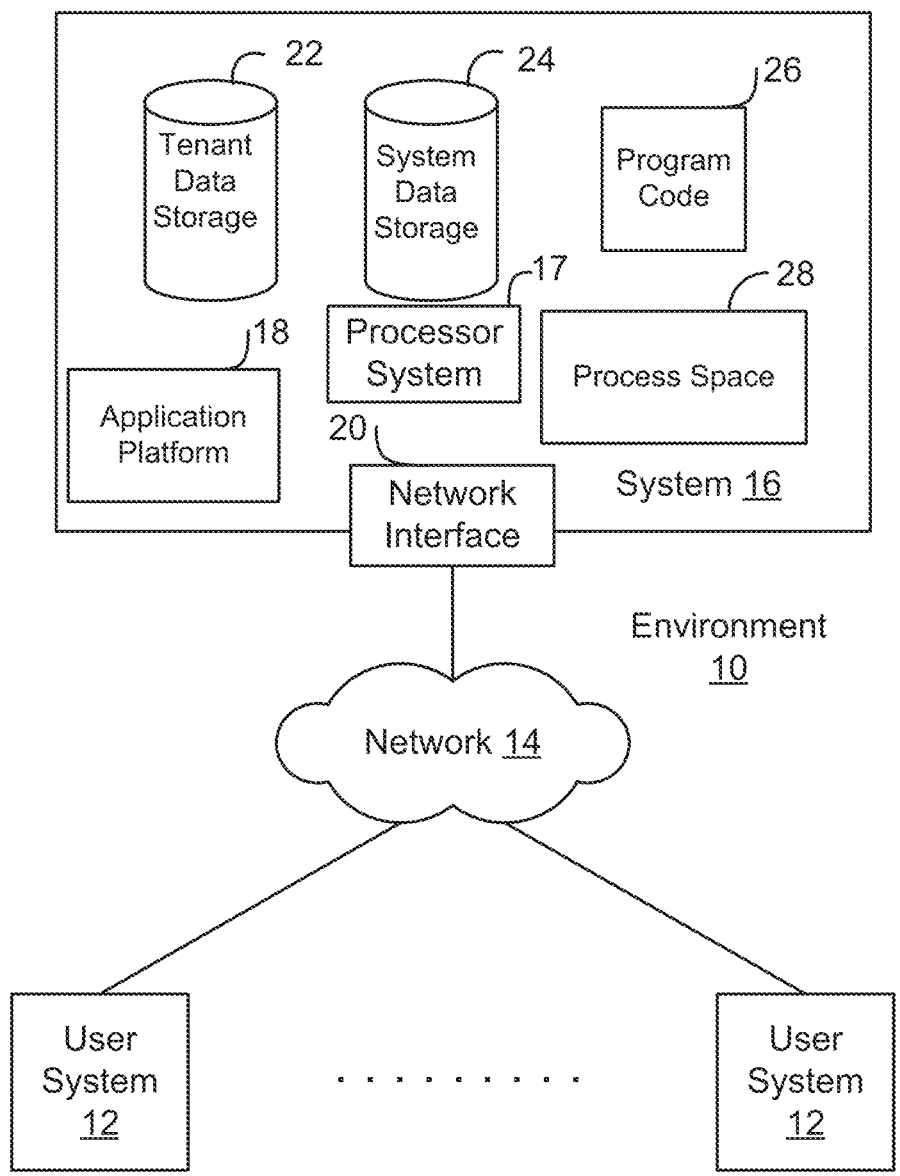
FIG. 1A shows a block diagram of an example environment in which an on-demand database service can be used according to some implementations.

The following detailed description discusses multiple exemplary embodiments for more efficiently managing devices, such as firewalls used to protect an organization. It will be appreciated while various alternatives are disclosed, they are approaches that may be pursued, but none are approaches that necessarily must be used. In addition, while issues with solutions may be identified with respect to one or more exemplary approaches described herein, none should be assumed to have been recognized in any prior art on the basis of being identified as a known issue. In this description, for the purposes of explanation, numerous specific details are set forth in order to provide a thorough understanding of the present invention. It will be apparent, however, the present invention may be practiced without these specific details. In other instances, well-known structures and devices are not described in exhaustive detail, in order to avoid unnecessarily occluding, obscuring, or obfuscating the present invention.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The following is a brief overview of selected features of various embodiments. This overview is not an extensive summary of the invention or claimed embodiments, is not intended to identify particularly significant aspects of disclosed embodiments, and does not delineate any particular scope of the invention. This overview merely presents some concepts that may facilitate, in a condensed and simplified format, understanding more detailed description below and appreciate the breadth of the claimed embodiments.

In embodiments, access to a network and associated resources (machines, software, etc.) may be granted to entities (people or machines), based on various considerations, and the access may be automatically granted for a desired time period and then automatically revoked. In some embodiments, a multi-user chat service may be used to exchange messages with a chat group, sometimes referred to as a chat channel. The messages may relate to security grant or revocation. People, software, artificial intelligence (AI), and/or machines may monitor the chat group and perform an action responsive to posted messages. Note that while the term "group" is used to refer to chat posts, it will be appreciated there might be one, none, or many members (e.g., people, software, machines, AI, etc.) following and/or receiving information from or about a group chat at any particular time.

FIG. 1 below discuss a complex cloud-based system with many different entities, e.g., servers, clients, databases, firewalls, other machines, etc. At any given moment there may be a need to investigate the status of an entity and possible change its status, e.g., perform an update, repair, or other service. However, to unwanted access to resources, security measures may be used to restrict what or who may change an entity's status. In various embodiments, entities may be automatically granted or revoked access to restricted resources based on status associated with the entity. Restricted resources may be sensitive data and/or data sources of the organization, and it may also refer to data an organization provides for other entities, such as data managed by the organization for its clients. An organization may, for example, provide database services to other entities and restricted resources may include production data of one or more clients. Access automation is helpful when, for example, there are many resources to protect, possibly with different access rights for different entities and/or where there are many entities to which access may be granted and revoked. For example, an organization may have a number of on call engineers whose status is tracked, for example, in a database, and/or by a third party service. Granting/revoking security access is typically a manual process, which is a burden, particularly if granting/revoking access for many entities, or managing multiple access levels, or if statuses change regularly (e.g., with shift changes, illness, breaks, or the like).

In addition to tracking and managing on call access for entities, there are occasions when an entity is not scheduled to have access to, e.g., restricted resources, but nonetheless requires ad hoc access. A request may be made, such as by an engineer's manager, to grant ad hoc access the protected resource. It will be appreciated on call entities may have different security levels, or different security access, than an ad hoc access grants. For example, an ad hoc access may be requested with a higher level access than provided on call engineers. The ad hoc requestor may be validated to ensure sufficient rights to request the access, e.g., to prevent granting better rights than one has. If the request would attempt to grant superior, in one embodiment an organizational hierarchy may be traversed to locate a sufficiently higher authority to approve an ad hoc request. It will be appreciated the requestor may also be given temporary elevated rights to enable requesting ad hoc access at a higher security clearance than the requestor ordinarily has, e.g., to facilitate one entity covering the role of another.

Managing ad hoc access is also a burden on an organization, particularly for large and/or active organizations. For example, if an engineer requires ad hoc access to restricted resources, such as a database production environment, granting access may require manual action by a Site Reliability Engineer (SRE), network and security engineer (NETSEC), or the like. Providing access may require manually engaging security tools, accessing interfaces and/or tools to give Active Directory (AD) (or the like) rights to the access recipient. And when the access need is removed, another manual effort is required to revoke granted access. When there are many engineers to manage, simply both on call and ad hoc requests represents a significant drain on organization resources. And, as with any manual process, mistakes may be made, such as a security risk of forgetting to revoke access. Further, since SRE/netsec engineers are typically also responding to emergencies, cyber-attacks, problem solving, outages, updating, infrastructure deployment, etc., time taken to grant/revoke access takes away from handling these other tasks. Automation allows an organization to focus its limited resources.

Automating access to restricted resources as discussed below will remove a manual burden from an organization, and allow focusing limited resources elsewhere.

FIG. 1A shows a block diagram of an example of an environment 10 in which on call and/or ad hoc access may be automatically granted to protected resources in the environment and automatically revoked. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. Please note that as used herein the "(s)" suffix on a word or phrase is simply used as a shorthand reference to indicate there may be one or more of the word or phrase; if the word or phrase is treated as a plural in this description or claims that follow, it is assumed one will make appropriate grammatical changes as needed to accommodate the plurality. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. It will be appreciated portions of the FIGS. 2-6 embodiments may be practiced within network 14, e.g., the FIG. 6 VPC(s) 604 may be at least in part within network 14, and some or all of the FIG. 6 network(s) 618 may be part of network 14.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead. It will be appreciated portions of the FIGS. 2-6 embodiments may be practiced in conjunction with the network interface 20, e.g., the network interface may be part of or communicatively coupled with firewalls such as FIG. 6 firewalls 608 and operate in accord with other illustrated embodiments.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
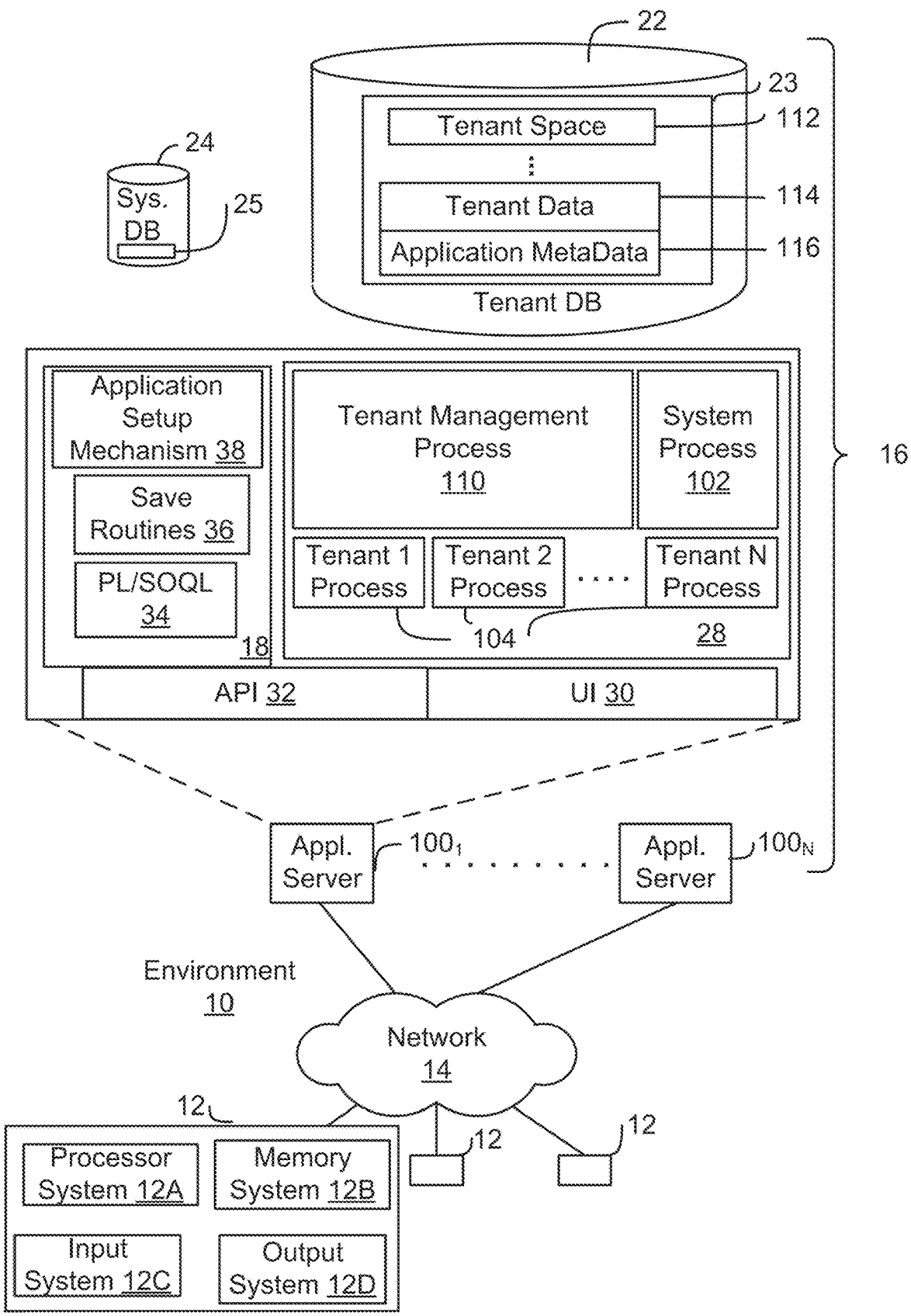
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
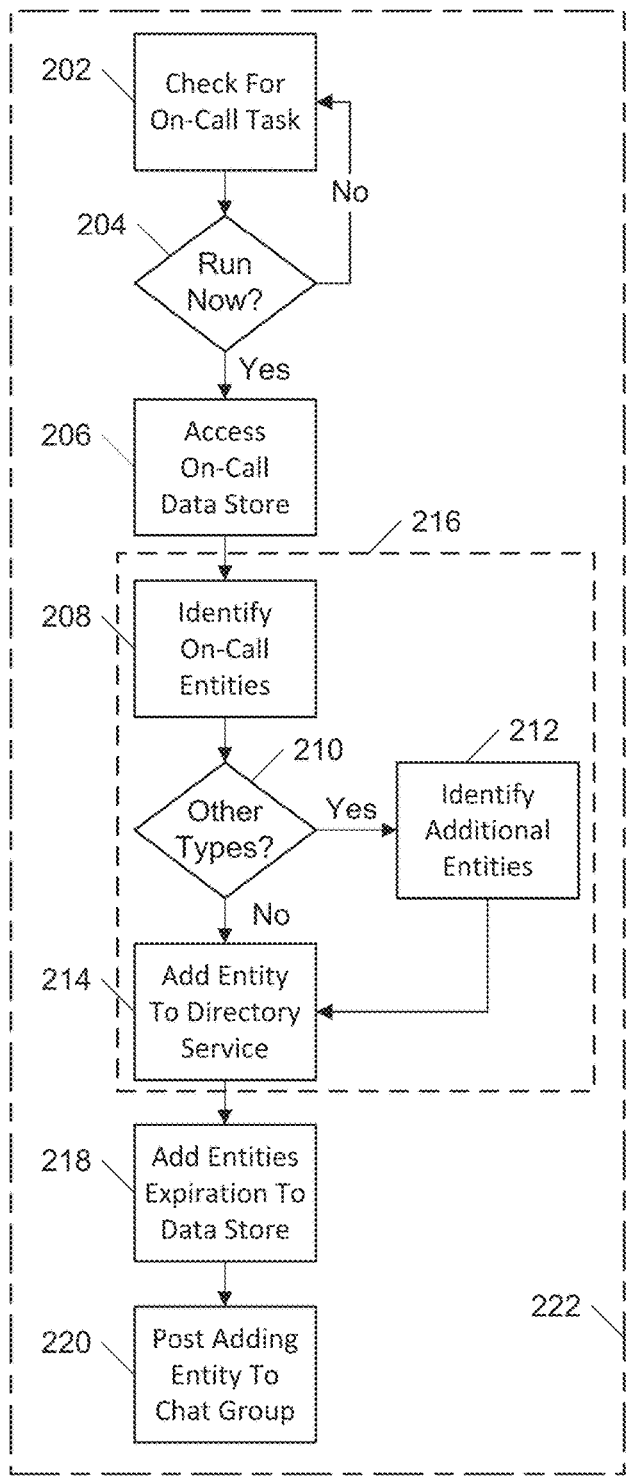
FIG. 2 illustrates an exemplary flowchart, according to one embodiment, for assisting with automatically granting access to a restricted resource(s).

FIG. 2 illustrates an exemplary flowchart 200, according to one embodiment, for assisting with automatically granting access to a restricted resource(s). It will be appreciated, at a high level, granting/revoking access may accommodate on call and/or ad hoc access that may be automatically granted or revoked based at least in part on data stored with an access resource, such as a database or data store tracking entities (e.g., machines, people, etc.) having, losing and/or being restricted from access to the resource(s).

In various embodiments, an indicator may be periodically retrieved from an access resource; "periodically" may be based on a schedule/scheduler, e.g., a Linux cron job or the like, or manually initiated, e.g., by way of a request by one entity in a tool to grant/revoke access for another entity, and/or responsive to a trigger or other event. The indicator may identify at least one entity's status, e.g., on call, ad hoc, or other status. Identified entities may be authorized to (or de-authorized from) access to a specific resource(s) or general access.

If one entity is requesting access on behalf of another entity, the requestor may be validated to confirm an authority to make the request. If the requestor lacks authorization, in some embodiments, one or more higher-level entity may be prompted with the request for authorization, e.g., an organizational "tree" may be traversed to locate a superior with authority and desire to request access. As with any robust authentication system, the grant of authority may be temporary, and periodically entities may have authorization revoked, such as at expiration of a time period. Authorization may also be restricted to avoid abuse or simple error, and may limit how often access may be granted in a given time period, e.g., grant access for up to 24 hours, once every 3 days. It will be appreciated the hours and days are purely exemplary and any limits, or no limits, may be set as desired.

In some embodiments, a multi-user/team/workspace "chat" system, such as the Slack® environment provided by Slack Technologies, Inc., may be used to convey authentication information. It will be appreciated by one skilled in the art that different entities, whether machines, software, and/or people, may monitor a chat session, chat room, or the like, for authentication-related messaging and take action thereon. In the illustrated embodiment, assuming software is performing at least a portion of some disclosed embodiments, one operation may be to check 202 for a scheduled on call task. It will be appreciated software may operate in parallel with other software, and software may itself provide multi-threaded execution, such that many different activities may be occurring substantially simultaneously depending on the design of the software and host operating system (OS). A host OS may modify, wholly or in part, operation of multi-tasking and/or multi-threaded software, and the OS may itself coordinate operation of multiple software instances.

Assuming various tasks, e.g., checking on call authentication, ad hoc authentication, authentication revocation, etc., are performed periodically, if 204 it is time to run the on call task, an operation may be performed to access 206 an on call data store. A data store may be any physical and/or logical construct that may store data, and as such may be used to refer to physical media with data stored there-on, such as firmware, programmable memory, or disk storage, as well as software structures in a memory, e.g., random access memory (RAM) or other state preserving medium or media. It will be appreciated the data-store may be local to a requesting environment, e.g., disposed within the same machine, both present on a particular communication medium, e.g., a local data path such as a network, or they may be remotely located, such as in communication over a public network, e.g., the Internet or other intermediary communication environment. In one embodiment, the on call data store may be presented as a service, such as a software service, provided by a server.

After accessing 206 the data-store, on call entities may be identified 208. Thus, for example an organization may schedule various employees to be on call to handle issues that may arise in a given time period, such as overnight, during a holiday, after hours, etc. It will be appreciated on call employees may change and that the data store may be updated to track who is on call. In some embodiments, a third party pager service, such as PagerDuty®, may be used to track at least employee on call status and/or provide alerts when there are events or occurrences of interest; a database or other data store may be accessed by an organization to inspect and/or monitor statuses, e.g., on call or other status of interest. If 210 it is desired to have other types of status to evaluate, then those other types may be identified 212 as well.

In one embodiment, a directory service such as the Active Directory (AD) service provided by Microsoft Corporation may be used to track authorization to perform various tasks. It will be appreciated AD, Slack, and other specific vendors mentioned herein are presented for exemplary purposes, only and that services may be used. For example, rather than AD, other directory services such as Zentyal, Samba, Univention Corporate Server, FreeIPA, OpenLDAP, 389 Directory Server, etc. may be used instead. In the illustrated embodiment, access to the restricted resource may be controlled based at least in part on membership in a certain AD group. If an entity lacks membership in the group then access to the resource may be denied.

Identified 208, 212 entities may be added 214 to the directory service, such as by adding the entity or entities to an appropriate AD group to indicate current authentication to access the protected resource. In one embodiment, AD groups may have various associated permissions and allowances based on the group, and adding an entity to a group may automatically allow the entity to inherit various access rights and available actions the entity may then perform. It will be appreciated the illustrated operations 208-214 are exemplary, and the illustrated operations 216 may be performed in a different order, and may include other operations not shown. For example, adding to an AD (or other directory service) may include other actions (not illustrated) such as inspecting permissions and/or rights associated with the group, and determining actions and/or abilities that may be performed after gaining group membership, etc. and an entity may be configured or reconfigured if needed to enable it to use new skills and/or newly available resources.

In addition to adding 214 to the directory service, the entity may be added 218 to a data store to track authentication expiration. As noted above, a common problem inherent to manually providing access to resources is remembering to remove the granted access. In the illustrated embodiment another data-store may be used to track expiration of granted access. The expiration may be tracked in the same data store as for tracking the on call statuses, or it may be a different data store. And as noted above the data store may be a physical, logical, in memory, accessible as a software service, or otherwise stored in a storage capable of storing information associated with and entity. By storing both the grant of access and the expiration of access, other software, process, routines, machine(s), entity(s), etc. may utilize the information and take action as appropriate.

The granting of access may be communicated by posting 220 changes to access, such as the adding of the entity, to a chat group in a chat system. Entities, such as software, processes, routines, machine(s) or computing device(s), people, etc. monitoring the chat group may see the message regarding changes in access and take action. In networked environments, for example, a Virtual Private Cloud (VPC) account(s) (see, e.g., FIG. 6) or similar environments, machines, entities, resources, etc. associated with the VPC may use a chat group as a pathway to distribute information to various related and/or interested entities. In some embodiments, one or more Application Programming Interface (API) or equivalent may be provided to facilitate communication. An API may specify data input/output requirement and/or format for processes, functions, routines, data structures, objects, object classes, variables, processing hooks, call-back functions, etc. The API may be publicly known and documented, such as used for Web API to interface web (e.g., Internet) clients and servers, such as a machine operating a web browser (e.g., internally running code and/or externally under operator control) that communicates with a web server or other networked machine.

A well-known API type that may be used is the REpresentational State Transfer (REST) APIs that are often used as they are robust, stateless, uniform layered, and extendable (code on demand). It will be appreciated a REST API may be inclusive of a Web API. The disclosed entities (clients, servers, cloud services, chat services, VPCs, machines, etc.) may be abstracted and represented as REST resources that may be manipulated as disclosed herein. Additionally, private APIs may be used when, for example, the communication ecosystem is well known and/or controlled, thus allowing private APIs that afford security and/or efficiencies possibly unavailable to a public and/or well-known API. In addition, APIs may enable a tool to support arbitrary operations. For example, an API may have an extensible interface to support future features of devices and/or software, as well as provide one function/API call that is actually aggregating multiple requests and/or device functions, or aggregating functionality of multiple devices, e.g., presenting a virtual device built on features provided by one or more other devices. It will be appreciated by one skilled in the art the illustrated operations 222 may represent one component of a larger event driven environment, where different tasks may be evaluated for execution. Hence the check 202 may correspond to many different operations to be evaluated for their time to run (see, e.g., FIG. 3 item 302 discussion below).

Figure 3:
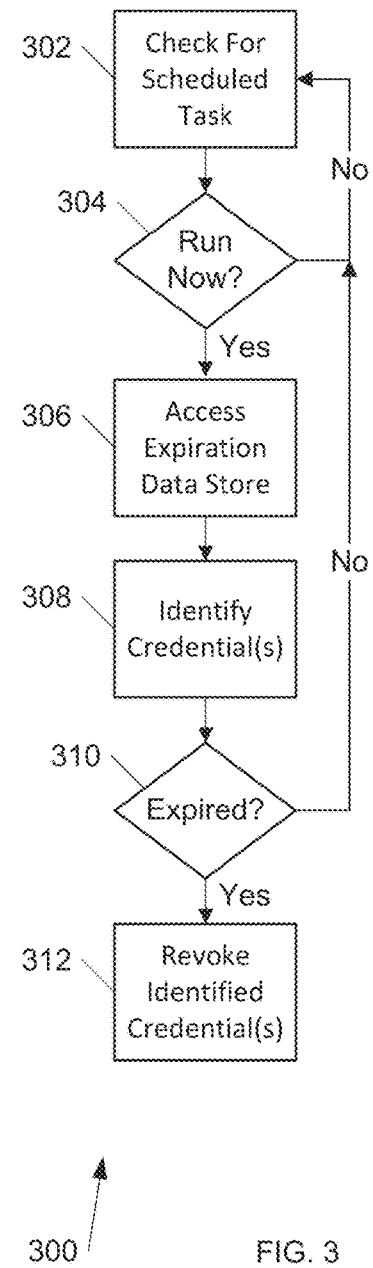
FIG. 3 illustrates another exemplary flowchart, according to one embodiment, for assisting with automatically revoking access to a restricted resource(s).

FIG. 3 illustrates another exemplary flowchart 300, according to one embodiment, for assisting with automatically revoking access to a restricted resource(s). Similar to FIG. 2, one operation may be to check 302 for a scheduled task, e.g., whether to perform the illustrated operations. It will be appreciated this embodiment may be performed in parallel with other software, processes, etc., and if 304 it is time, the illustrated embodiment is performed.

It will be appreciated items 302, 304 may be the same or similar operations of FIG. 2 items 202, 204, in which a control function or equivalent is configured to check for running this embodiment. As illustrated an expiration data store may be accessed 304. In one embodiment, the data store corresponds to the data store of FIG. 2 item 218, however it will be appreciated a different data store may be used (see, e.g., FIG. 6 items 614, 616, 642, 644). Accessing a data store refers to the appropriate data access technique(s) required to obtain data. Thus for example, if the data store if a database, then relevant database commands and/or access techniques are used as needed. If the data store is remotely located, such as by way of a remote server or third party service, then access may be by way of a private and/or public API. In one embodiment, a chat service is used to signal information about access changes, such as adding and/or deleting access. Entities (machines, software, etc.) monitoring the chat service will detect the chat message and, if interested in the message, take appropriate action. In one embodiment, the chat system may share arbitrary data, including messages, data files, program code (interpreted, executed, to be compiled, etc.), data structures, hyperlinks, Uniform Resource Locators (URLs), or other data.

After accessing 304 the data store, credentials stored in the data store (e.g., if the data store includes a database), or otherwise associated with the data store, are identified 306. It will be appreciated in a multi-user multi-processing environment there may be multiple entities indicated by the data store. A test may be performed to determine if 308 a given entity credential(s) has expired. If so, then the identified credential(s) may be revoked. If 308 the credential is not yet expired, or if 302 it was not yet time to check, then processing may loop back to checking 302 (e.g., waiting) for the scheduled task.

Figure 4:
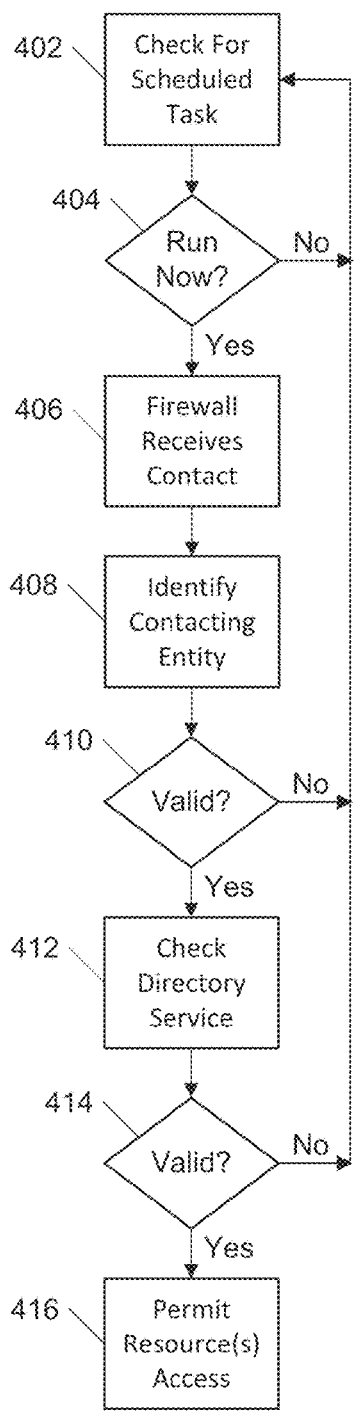
FIG. 4 an exemplary flowchart, according to one embodiment, for a firewall operating in conjunction with automatically granted or revoked resource access.

FIG. 4 illustrates an exemplary flowchart 400, according to one embodiment, for a firewall operating in conjunction with automatically granted or revoked resource access. Similar to FIGS. 2 and 3, one operation may be to check 402 for a scheduled task corresponding to performing this embodiment. Performance may be performed in parallel with FIG. 2 and/or FIG. 3, and if 404 it is time, it is performed. If not, processing may loop back, e.g., to wait.

It will be appreciated while the illustrated operations reference a firewall, disclosed techniques are applicable to any device(s) that operate like a firewall or gateway and inspect information traveling through or otherwise detected by the device. Actions may be taken relating to inspected information. In various embodiments, it will be appreciated the device may be communicatively coupled with one or more networks, and/or other communication mediums, and the networks may be public, private and/or a combination of the two. For example, a network may include a node/machine on the Internet (public network), and/or be within an intranet, private network, and/or other private communication medium. In some embodiments, a "private" network may be defined within a public and/or private network(s), e.g., it may be defined as a virtual private cloud (VPC) in association with network resources provided by a cloud service.

Examples of cloud service providers include, by way of example only, and not to be seen as limitations inferred from differences between cloud services and/or infrastructure, include Amazon Virtual Private Cloud (Amazon VPC), Amazon Elastic Compute Cloud (EC2), Microsoft Azure (e.g., Hybrid cloud), Google Cloud, Alibaba Cloud, IBM's cloud services, Oracle cloud services, etc. It will be appreciated these or other cloud services and cloud infrastructure vendors provide on-demand and configurable shared computing resources allocated from one or more public and/or private cloud environments, and may provide virtual private environments isolated from other environments/customers having their own associated resources. Various hardware and/or software techniques may be used to establish private environments, such as by allocating private address spaces, e.g., Internet Protocol (IP) subnets, providing private virtual communication interfaces, e.g., virtual Local Area Networks (VLANs), virtual private networks (VPNs) to securely control access to virtual private environments. For convenience, assume the cloud service is compatible with the well-known Amazon AWS/EC2 services, and network perimeter security devices, while not required to be a firewall, are assumed operationally compatible with the Palo Alto Networks managed firewalls.

In some embodiments, it is assumed private networks, virtual private environments, or the like, use Palo Alto Networks (PAN) Firewalls (FWs) or equivalent type devices as security devices to protecting access to restricted resources. In some embodiments, the Amazon Web Services (AWS) platform may be used to implement a private environment shielded by the PAN firewalls where the firewall is able to validate entities seeking access to protected resources, e.g., one or more resource on a private network which may be defined with respect to a VPC. If an organization has on call entities, such as on call support engineers, or other entities that may rotate into and out of a position or status from some period of time (e.g., the time on call), the on call (or other status) associated with an entity may, as discussed above, be tracked at least in part by adding the entity to a directory service (see, e.g., FIG. 2 item 214).

As illustrated, a firewall may receive 406 contact. To ensure that the contact is from an appropriate entity, the firewall may identify 408 the contacting entity. Identification may be by way of any of a number of techniques, including checking the information associated with the contacting entity, such as machine name, known network source address, appropriate destination address, encryption credential(s), directory service attributes associated with the entity, etc. It will be appreciated an encryption credential(s) includes using any manner of cryptographic environment to authenticate, such as sharing a known pre-shared key and/or certificate, entering a username and password, public key cryptography (PKC), International Telecommunications Union (ITU) X.509, public key infrastructure (PKI), etc. If 410 the contacting identity is valid, then a further operation may be made to check 412 whether the contacting entity has a directory service entry associated with the entity that indicates being allowed to access the restricted resource. That is, rules may be established that only entities with a particular directory service group association can access the restricted resource, and thus the firewall may evaluate the contacting entity for this directory service association.

If 414 the contacting entity has the appropriate directory service association, then the firewall may permit 416 the entity to access the restricted resource(s). However, if the contacting entity lacks the proper directory service association, or if 410 the contacting identity was not valid, then for simplicity it is illustrated that processing loops back to checking for executing the scheduled task. It will be appreciated in a more complete program flowchart, various error conditions may be performed instead of a simple loop back. It will be appreciated other embodiments may not perform all operations presented in any given illustration. For example, in this embodiment, the firewall may be configured to only allow certain contacting entities to access a restricted resource, however in other embodiments the firewall may not perform the illustrated identity check 408.

Figure 5:
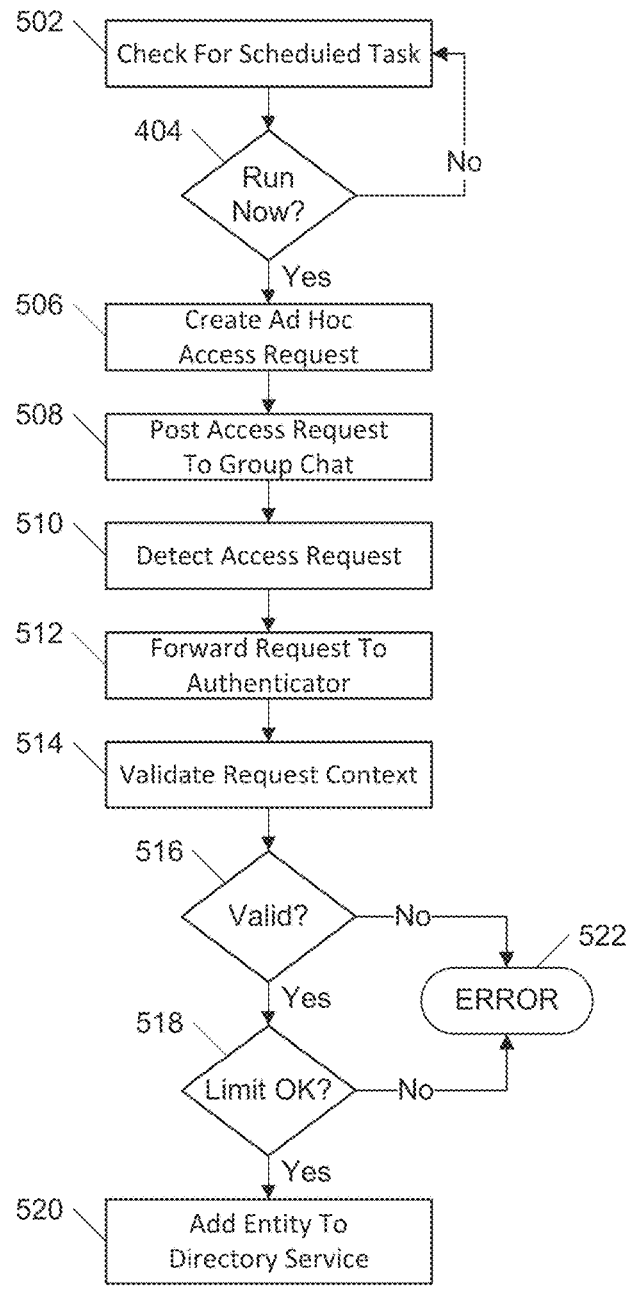
FIG. 5 illustrates an exemplary flowchart, according to one embodiment, for assisting with automatically managing ad hoc resource access.

FIG. 5 illustrates an exemplary flowchart 500, according to one embodiment, for assisting with automatically managing ad hoc resource access. Similar to FIGS. 2-4, a check 502 for a scheduled task may be made to determine whether to perform this embodiment. It will be appreciated the illustrated embodiment may be performed in parallel with FIGS. 2-4, and if 504 it is time to run the illustrated embodiment, it is performed. As discussed above, on call status may be determined based at least in part on an entity being listed in a data store, such as one associated with PagerDuty or other service and/or resource tracking on call status for an entity. An indication in a data store may be used with automatically granting (see, e.g., FIG. 2 item 214) and automatically revoking (see, e.g., FIG. 2 item 218) access to protected resources.

There are ad hoc situations requiring access separate from on call entities, and hence the entity needing access is not indicated in a data store tracking authorized entities. In one embodiment, to initiate a request for ad hoc access, a requesting entity (e.g., a machine or computing device) may submit a message to a chat system with information describing the ad hoc request for access. In one embodiment the computing device may be operated by a person. In other embodiments, the computing device may be operating under control of an application specific integrated circuit (ASIC), programmable gate array (PGA), field PGA (FPGA), other fixed and/or programmable circuitry, artificial intelligence (AI), and may be disposed within a special purpose and/or a general purpose computing device (e.g., a laptop). The request may be posted to a chat system group message environment, such as a Slack Channel, where other entities (machines, software, people, etc.) may monitor the chat system for such messages and take action in response.

For example, if the requestor is an operator of a tool running on a machine, e.g., a laptop computer, the requestor may use the tool to create 506 an ad hoc access request for another entity, e.g., an engineer being asked to investigate an issue with an otherwise restricted resource, e.g., a database hosting live customer data. The request will contain information to enable deciding whether access will be granted, such as the identity of the requesting entity (e.g., the requestor), identity of the entity to be granted access, indication of the resource(s) to which access is desired, desired duration of access, etc. It will be appreciated the tool to create the request may include a display of information to an operator of the tool, and the term "display" corresponds to whatever format of output is needed to present operation choices to the management tool. For example if an Artificial Intelligence (AI) Engine (see, e.g., FIG. 7 item 744) is operating the tool, then the "display" will correspond to appropriate signals and/or data output for processing by the AI or other controlling hardware and/or software. Alternatively, if the tool is operating in a device to be used by, for example, a sight impaired user, then "display" corresponds to providing a tactile output, e.g., Braille, and/or an audible output, to indicate operations of the tool.

The request may be posted 508 to the chat system, e.g., into a group chat relating to access requests, access removal and/or other security issues. It will be appreciated postings to the group may follow a known structure or format to facilitate processing messages in the group chat. However postings may also be presented in a natural language format and a natural language parser (NLP) or equivalent system may be used to interpret posted messages. The posted message may therefore be detected 510 and processed and/or responded to. For example, a monitoring service (which may be hosted locally and/or remotely), such as within a gateway, may monitor the group chat, and detect the posted message regarding providing ad hoc access for an entity. If we assume that organization resources are protected by a security apparatus, such as by one or more firewalls, the detected message may be forwarded 512 to the security apparatus(es) for evaluation. In one embodiment, the organization's resource(s) is at least in part provided by a Virtual Private Cloud (VPC), of which the security apparatus is part.

In one embodiment the gateway is a machine, software or combination of the two on a private network including the restricted resource for which access is desired, and the gateway communicates data, including the access request, to the security apparatus. The security apparatus may receive and validate 514 the access request either directly, e.g., the security apparatus may be a firewall that performs validation, or indirectly, e.g., the security apparatus passes the request to an associated service, server, or other software and/or computing device capable of performing the validation. It will be appreciated information may be evaluated to ensure the access request is valid. For example in the illustrated embodiment, the security apparatus may confirm the requestor has authorization to make the request. Authorization may be determined based on information associated with the requestor, such as based on data in a data store and/or based on directory service attributes associated with the requestor, e.g., verifying an appropriate Active Directory (AD) membership.

If the requestor lacks appropriate authority, the request may be denied, or alternatively, as discussed above, a search may be made to locate an entity with authority and willingness to approve the request, or submit the request on behalf of the requestor. Authorization may also be based on confirming the request is valid and not spoofed; legitimacy of the authorization may be evaluated in a variety of ways, such as by cryptographic encoding, signing or other techniques to ensure a valid tool/environment generated the request and it was received by the security apparatus without modification.

In one embodiment, authorization may also be determined based on characteristics about the request, such as has the request been made too many times in a certain time frame. For example, there may be an organization set rate limit rule requiring no more than one ad hoc request per, for example, three days. If 516 the request appears validly issued, another test may be to check if 518 a rate limit is ok. It will be appreciated security policy and/or other requirements may include satisfying other operations, not illustrated, before validating 514 the access request. If the tests pass, then the entity for which access is requested may be added 520 to the directory service, e.g., the entity may be added to an appropriate AD group. If either validation text 516, 518 fails, then an error handler 522 may be called to address the failure. And, although not illustrated, processing may also loop back checking 502, e.g., waiting.

Figure 6:
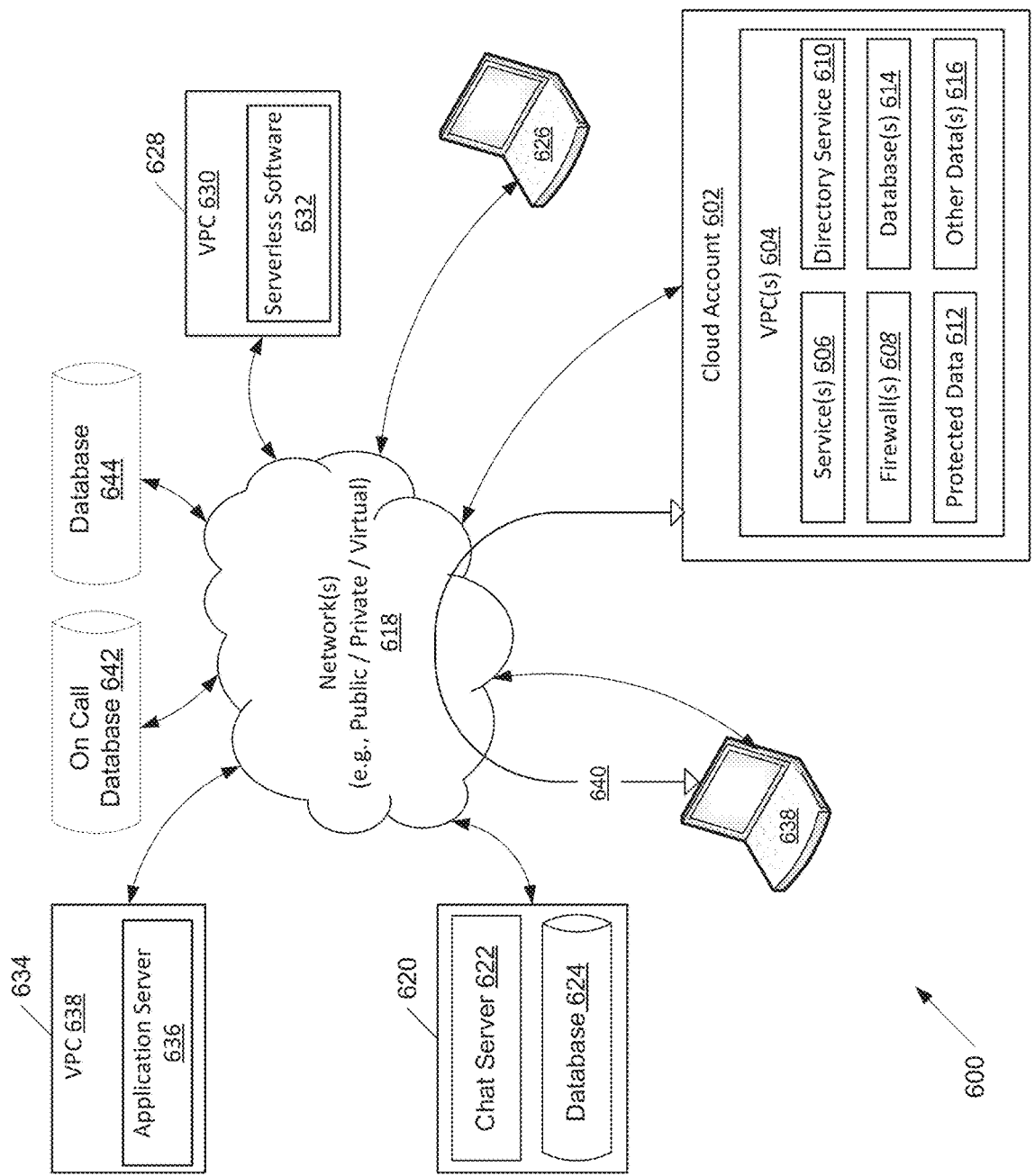
FIG. 6 illustrates a system according to one embodiment that may be used to perform, for example, selected aspects of the FIGS. 2-5 embodiments

FIG. 6 illustrates a system 600 according to one embodiment that may be used to perform, for example, selected aspects of the FIGS. 2-5 embodiments. As discussed above, in various embodiments, there may be one or more machine or computing device, that may be operating under direction of hardware and/or software (or their equivalent), that may be used to request support on call access to a protected network resource(s), and support ad hoc access. Requests may be made, e.g., with a computing device providing an interface exposing an Application Programming Interface (API) to facilitate access rights management.

Ad hoc requests may be tracked automatically. On call entities may also be tracked automatically. A chat system may be used to distribute data and/or notification. Rules may be applied to ad hoc requests and/or on call entities to constrain resource(s) access. Requestor, approver, entity recipient, directory service attributes, etc. may be logged for grant decisions, revocation decisions, auditing, payment, AI analysis, etc. By automating processing ad hoc requests and on call entities, limited organization resources may be freed to perform higher priority tasks, and automation may help assure appropriate revocation of access when they expire and/or are no longer necessary. It will be appreciated the disclosed embodiments may be applied to any access grant to any resource of a Virtual Private Cloud (VPC). Access may also refer to use of computing resources, such as high-speed processing environments, high-end camera systems, or other material to which regulated access is desired.

In the illustrated embodiment, an organization may maintain one or more cloud account 602 which may be associated with a cloud service(s). For convenience we assume the cloud service(s) is Amazon Web Service (AWS) compatible, and providing Amazon Elastic Compute Cloud (EC2) environments and other service. Shown are one or more Virtual Private Cloud (VPC) 604 that may be associated with the cloud account. Each VPC may provide various functionality, such as one or more service(s) 606, such as software provided by an organization and hosted in the VPS, or it may present a service provided by the VPC's host, e.g., "serverless software" or equivalent event-driven platforms such as Amazon Lambda. The software service may respond to or assist with, for example, ad hoc access requests for a protected resource, by running code as needed to authenticate the requestor, validate the request, or other action. It will be appreciated the service(s) 606 may be provided by a separate entity 628, which may be a separate VPC 630 hosting "serverless software" 632.

The VPC 604 may add directory service entries in the directory service 610 (see, e.g., FIG. 2 item 214, FIG. 5 item 520), track access expiration information in one or more database 614 associated with the VPC (see, e.g., FIG. 2 item 218), revoke credentials (see, e.g., FIG. 3 item 310), validate entities seeking protected resources of an organization (see, e.g., FIG. 4 items 408-414), and authenticate ad hoc access requestors and request contexts (see, e.g., FIG. 5 items 514-518). The VPC may also contain or more firewall 608 to protect access to the organization and its resources, such as protected data 612 or other data 616, and assist with ad hoc access requests (see, e.g., FIG. 4 item 406 discussion). Various illustrated components may be interconnected by way of a public, private and/or virtual network(s) 618. Public networks include, for example, the internet. Private networks include, for example, networks defined for private use by the VPC 604. Although the network(s) is illustrated as a single item, it may have multiple separate connected networks that may or may not have overlapping address spaces.

A chat service 620 may be used to convey information. In one embodiment, the chat service includes a chat server 622 to manage, for example, a multi-entity (e.g., machines, people, etc.) group chat with messages stored in a chat database 624. It will be appreciated the chat service may be provided by a separate entity communicatively coupled with the VPC 604; although illustrated as a separate item, it will be appreciated the chat service may be disposed in and/or provided by the VPC. Thus, a manager seeking ad hoc access for an engineer, may use a computing device 626, e.g., a laptop computer or other computing device or machine, and run a request application. The application may be a Slack application, or the like, to make the ad hoc request. The application may be stored in the computing device, made available by the VPC 604, and/or provided by other software or hardware not illustrated. The ad hoc request is communicated to the chat system 620 for distribution as a chat message.

Various entities may monitor the chat system for messages of interest, such as the ad hoc access request. One such entity 634 may provide an application server 636 which may be hosted in a VPC 638. The application server may provide, for example, a gateway that monitors the chat server 622 and forwards messages of interest from the database 624 to, for example, the service(s) 606 and/or serverless software 632. As noted the serverless software or equivalent functionality need not be part of the VPC 604. Once the ad hoc access request is forwarded, it may be evaluated (see, e.g., FIG. 5 items 512-518 and related discussion). If approved, then an engineer may access the protected data 612 by way of a computing device 638 over a communication pathway (datapath) 640 determined between the computing device and the protected data. The datapath couples the computing device 638 to the cloud account 602 to which is associated the VPC 604 hosting the protected data 612 that is now at least temporarily accessible to the engineer.

In one embodiment, after the ad hoc request is approved, the approval is sent back to a service operating on the VPC, e.g., within the service(s) 606, other data 616, or elsewhere (not illustrated), which in turn grants the engineer getting access to appropriate directory service rights, e.g., adds the engineer to a specific Active Directory group required for access protected data 612. It will be appreciated the serverless software 632 and/or the service(s) 606 may communicate by way of an API exposing functionality of the Slack app or other tool used to make the ad hoc request, and in one embodiment, is enabling communication between computing device 626, though a gateway such as entity 634, and service(s)/software 606, 632.

As illustrated there may be various databases 642, 644 accessible to entities that may be used to make decisions and/or decide to take action. For example, there may be a database 642 used to track on call data about entities, e.g., data corresponding to people and/or computing devices (see, e.g., FIG. 2 item 206). As discussed above, this database may be inspected periodically to determine on call entities so they may be automatically granted access to a restricted resource(s), e.g., protected data 612. It will be appreciated expiration information for on call entities may also be stored in the on call database, or stored elsewhere, such as in a database 614 associated with an organization hosted in a VPC 604. It will be appreciated features disclosed herein may be provided by multiple different entities that cooperatively perform together to implement the disclosed embodiments.

Thus, for example, an engineer using a computing device 638 may be designated as on call for a weekend, and that information is stored in the on call database 642, along with an expiration of the on call status, e.g., at the end of the weekend. An application associated with a VPC 604 hosting an organization's can periodically poll the on call database and retrieve the identifiers of the on call engineer(s), and automatically associated appropriate directory service 610 credential(s) to the entity to enable access to protected data 612 for the duration of being on call. In one embodiment, the an application is provided with the service(s) 606 of the VPC. In another embodiment, the application is hosted such as with serverless software 632. With an appropriate associated directory service credential(s), a firewall 608 receiving contact from the computing device 638 will identify the entity (e.g., an operator) associated with the computing device, confirm the directory service credential, and allow access to protected data 612. It will be appreciated the computing device does not have to be physically local to the environment, e.g., directly attached to the VPC, and may connect to the VPC by way of a cryptographic link, such as a Virtual Private Network (VPN), established with a firewall 608.

In the illustrated embodiment, it is understood the VPC(s) 604 may be implemented by a cloud service on a private and/or public network(s) 618. The underlying network does not matter so long as a private network environment, sometimes called an "intercloud", is defined such that it includes machines within a perimeter, where the perimeter separates items internal to a particular private environment from items external to that private environment. Some or all firewalls 608 may be considered a gateway or pathway through the perimeter, where the firewalls have interfaces, communication ports, or the like facing both inward toward machines internal to a private environment, as well as facing external, such as to receive connections from the Internet or other network(s) 618.

Figure 7:
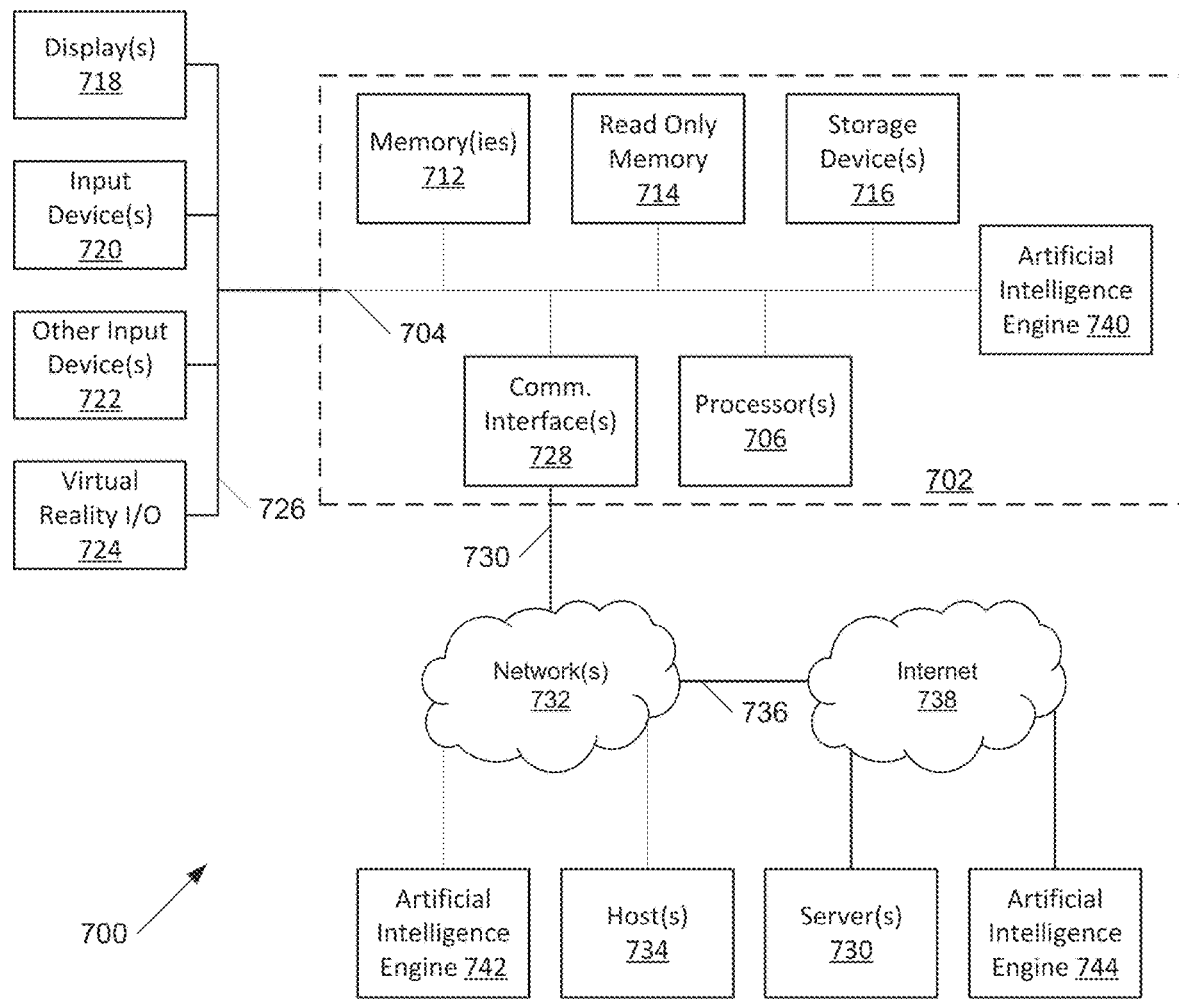
FIG. 7 illustrates an exemplary hardware environment according to one embodiment.

FIG. 7 illustrates an exemplary hardware environment 700 according to one embodiment. It will be appreciated the environment 700 may share features and characteristics discussed with respect to elements of FIG. 1 and FIG. 6. Disclosed above are procedures, systems, methods, processes, and the like that may be implemented by one or more general purpose or specific purpose computing devices. Specific purpose computing devices may be hard-wired to perform the techniques, or may include digital electronic devices and operate in whole or in part under control of an application specific integrated circuit (ASIC), programmable gate array (PGA), field PGA (FPGA), or other fixed and/or programmable circuitry that may be persistently programmed to perform aspects of disclosed embodiments. General purpose and specific purpose devices may include program instructions in firmware, memory, or other storage, or a combination where if the instructions are executed by a processor implement aspects of the disclosed embodiments.

Specific purpose devices include by way of example only and not intended to be a limitation, desktop computer systems, portable computer systems, handheld devices, networking devices, telephones, tablets, transportation devices, or any other device that incorporates hard-wired and/or program logic to implement disclosed embodiments. General purpose devices, include by way of example only and not intended to be a limitation, a laptop (see, e.g., FIG. 6 items 626, 638) or other machine that may execute an operating system and/or software to program to program functionality of the device. For example, illustrated is a computer system 702 upon which embodiments or portions of embodiments of the invention may be implemented. The computer system includes a bus 704 or other mechanism for communicating information within the computer system, and one or more processor(s) 706 coupled with the bus for processing information. The processor(s) may be, for example, a general purpose microprocessor, a custom processor, or other processor or collection of processors. It will be appreciated multiple processors may operate collectively as if as a single processor. Although the processor(s) are shown as all within the computer system, there may be other processors accessible over another bus (not shown), such as by way of an attached external enclosure containing processors. Additionally, information execution may be distributed across multiple processors accessible over one or more network(s) 708, e.g., internal networks within an environment including the computer system, and/or over the Internet 710.

The computer system 702 also includes a memory 712, e.g., a main memory, such as a random access memory (RAM) or other dynamic storage device, coupled to the bus 704 for storing information and instructions to be executed by the processor(s) 706. The main memory may also be used for storing temporary variables or other intermediate information during execution of instructions to be executed by the processor(s). Such instructions, when stored in non-transitory storage media accessible to the processor(s), render the computer system into a special-purpose machine that is device-specific to perform the operations specified in the instructions. The computer system may further include a read only memory (ROM) 714 or other static or non-volatile storage device coupled to the bus 704 for storing information or instructions for the processor(s). A storage device or devices 716, such as a magnetic disk, optical disk, or other storage media may be provided and coupled to the bus for storing information and instructions.

The computer system 702 may be coupled via the bus 704 to one or more output device(s), e.g., display(s) 718, such as a liquid crystal display (LCD), for displaying information to a computer user. A display may also include devices, such as Braille output devices, or other devices intended to facilitate presenting information to users that may benefit from sensory accommodation, such tactical and/or altered visual output for sight-impaired users. There may also be input devices 720, including alphanumeric and/or other keys, coupled to the bus for communicating information and command selections to the processor(s) 706. There may be other input devices 722, such as a mouse/tablet/trackball/cursor direction keys/Braille device, or other sensors including biometric devices to translate biometric information into input, for communicating direction information and command selections to the processor(s), and which may control, for example, cursor movement on the display(s). There may also be Virtual Reality Input/Output (I/O) 724 devices that may be used in addition to or in lieu of the other devices 718-722. It will be appreciated Virtual Reality may operate both as an information display of operation of the computer system, and also provide 2D and 3D input mechanisms, e.g., through movement of wands or other devices the virtual reality system monitors, as well as by visual monitoring and analysis of use movement, such as gesturing. The input and output devices 718-724 may communicate with the computer system over one or more communication pathways 726 that may interconnect these devices with the computer system. The computer system may be remotely controlled and not require direct user access.

The computer system 702 may implement the techniques described herein using device-specific hard-wired logic, one or more ASICs or FPGAs, firmware and/or program logic which in combination with the computer system causes or programs the computer system to be a special-purpose machine. As circuit technology continues to advance it is contemplated that disclosed embodiments may be presented with advancing technology. For example, quantum-state readout and measurement circuits for qubits, used in quantum computation devices, may be used to encode the processing and/or data storage aspects of disclosed embodiments. According to one embodiment, the techniques herein are performed by the computer system in response to the processor(s) 706 executing one or more sequences of one or more instructions contained in the memory 712. Such instructions may be read into the memory from another storage medium, such as from the storage device(s) 716. Execution of the sequences of instructions contained in the memory causes the processor(s) to perform the process steps described herein. In alternative embodiments, hard-wired circuitry may be used in place of or in combination with software instructions.

Storage media refers to any at least partially non-transitory media that may store data and/or instructions that cause a machine to operation in a specific fashion. Non-volatile media includes, for example, solid state disks (SSDs), optical or magnetic disks, etc. and may be used at the storage device(s) 716. Volatile media includes dynamic memory, such as the memory 712. There are many known volatile and/or non-volatile media memory and media formats that may be used to provide temporary or permanent storage. Storage media may be used in conjunction with transmission media. Transmission media participates in transferring information between storage media. For example, transmission media includes wireless and wired mediums, including the bus 704, modulated signals, acoustic waves, or light waves, such as those generated during radio-wave and infra-red data communications. It will be appreciated data may be optically encoded (e.g., represented as light packets), to encode instructions, data, and/or operational state of the computing system.

Various forms of media may be involved in carrying one or more sequences of one or more instructions to the processor(s) 706 for execution. For example, the instructions may initially be carried on storage of a remote computer. Assuming a similar configuration as the computer system 702, the remote computer can load the instructions into its memory and send the instructions over a communication pathway, which may be any form of wired or wireless communication medium. A corresponding receiving device local to the computer system may receive the data and convert the received information for placement on the bus 704. The bus may then carry the data to the memory 712, from which the processor(s) retrieves and executes the instructions. The instructions may be stored on the storage device(s) 716 before or after execution by the processor(s).

The computer system 702 includes a communication interface(s) 728 coupled to the bus 704. The communication interface(s) provides a two-way data communication coupling to a network 730 that is connected to a local network(s) 732. The communication interface(s) may include devices to communicate over a network such as by way of a local area network (LAN) or other network to provide a data communication connection for the computer system. Wireless links may be utilized. The communication interface(s) sends and receives signals in a format appropriate to the communication medium (e.g., electrical, electromagnetic, optical, etc.) that carry digital data streams representing various types of information. The communication interface(s) 728 allow a computer system to send and/or receive information through one or more network(s) to other data devices. For example, there may be a network link through the local network(s) to a host computer 734. There may be a link 736 that interconnects the local network(s) with the Internet 738, through which the computer system may communicate with another machine, such as one or more remote server(s) 740 which may send or receive requests to process data, retrieve and/or store information, etc.

In addition, various embodiments may employ Artificial Intelligence (AI) Engines (or "machine intelligence") to assist with operating, e.g., the management tool, devices being managed by the management tool, or other devices/machines as desired. It will be appreciated there are many different AI Engines that may be employed, such as neural networks (feedforward, recurrent, backpropagation, deep learning, etc.), expert systems, and many other analytical systems. It will be appreciated an AI Engine 740 may be incorporated into the computer system 702. However, since a robust AI Engine may require robust resources unavailable to certain computers, and AI Engine 742 may be available over a local network(s) 732 and/or an AI Engine 744 may be available as a remote resource accessible over, for example, the Internet 738. It will be appreciated one or more of the AI Engines 740-744 may cooperatively operate to analyze problems and suggest answers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically granting and revoking access to restricted resources based at least in part on selected ones of an indicator stored with an access resource or an ad hoc request from a requestor, the restricted resources include a first restricted resource and a second restricted resource, the method comprising:
   periodically retrieving the indicator from the access resource, the indicator at least identifying a first entity having an associated on call status;
   automatically determining an access for the first entity to the first restricted resource based at least in part on the indicator;
   receiving the ad hoc request to authorize a second entity with access to the second restricted resource for a time period;
   determining if the requestor is authorized to make the ad hoc request, and if so, granting the second entity access to the second restricted resource;
   sending a message corresponding to the ad hoc request from the requestor;
   automatically de-authorizing the first entity based at least in part on the indicator; and
   automatically de-authorizing the second entity based at least in part on the time period.

2. The method of claim 1, further comprising determining the indicator fails to identify the first entity with an on call status.

3. The method of claim 1, further comprising determining an expiration of the time period.

4. The method of claim 1, wherein the determining if the requestor is authorized further comprising:
   verifying compliance with a request limit associated with the ad hoc request;
   wherein the requestor is unauthorized to make the ad hoc request based at least in part on a noncompliance with the request limit.

5. The method of claim 4, wherein the request limit corresponds to a frequency of receiving ad hoc requests associated with one or more of the requestor and the second entity.

6. The method of claim 1, in which a group messaging platform may distribute messages having an associated topic, the method further comprising providing the message to the messaging platform with an associated topic corresponding to the ad hoc request.

7. The method of claim 1, in which a directory service permits access to the first restricted resource based at least in part on membership in a directory service group, the method further comprising:
   automatically adding the first entity to the directory service group based at least in part on the indicator; and
   granting the first entity the access to the first restricted resource based at least in part on being a member of the directory service group.

8. The method of claim 7, the method further comprising:
   automatically removing the first entity from the directory service group based at least in part on the indicator; and
   denying the first entity the access to the first restricted resource after the removing the first entity from the directory service group.

9. The method of claim 1, in which the restricted resources are hosted in a virtual private cloud (VPC), a directory service is hosted by a cloud service, and a chat system is accessible by both the VPC and the cloud service, the method further comprising:
   providing the message to the chat system; and
   receiving, responsive to the providing the message, data from the cloud service data indicating at least whether the requestor is authorized to make the ad hoc request.

10. A system to automatically grant and revoke access to restricted resources based at least in part on selected ones of an indicator stored with an access resource or an ad hoc request from a requestor, the restricted resources include a first restricted resource and a second restricted resource, comprising: a processor; and memory coupled to the processor and storing instructions that, when executed by the processor, cause the system to perform operations comprising:
   periodically retrieve the indicator from the access resource, the indicator at least identifying a first entity having an associated on call status;
   automatically determine an access for the first entity to the first restricted resource based at least in part on the indicator;
   receive the ad hoc request to authorize a second entity with access to the second restricted resource for a time period;
   determine if the requestor is authorized to make the ad hoc request, and if so, grant the second entity access to the second restricted resource;
   send a message corresponding to the ad hoc request from the requestor; and
   automatically de-authorize the first entity based at least in part on the indicator, and de-authorize the second entity based at least in part on the time period.

11. The system of claim 10, the instructions including further instructions to cause the system to perform: determine the indicator fails to identify the first entity with an on call status.

12. The system of claim 11, the instructions including further instructions to cause the system to perform: determine an expiration of the time period.

13. The system of claim 10, wherein the instructions to determine if the requestor is authorized further including instructions to cause the system to perform:
    verify compliance with a request limit associated with the ad hoc request; and
    determine the requestor is unauthorized to make the ad hoc request based at least in part on a noncompliance with the request limit;
    wherein the request limit corresponds to a frequency of receiving ad hoc requests associated with one or more of the requestor and the second entity.

14. The system of claim 10, in which a group messaging platform may distribute messages having an associated topic, the instructions including further instructions to cause the system to perform:
    provide the message to the messaging platform with an associated topic corresponding to the ad hoc request.

15. The system of claim 10, in which a directory service may permit or deny access to the first restricted resource based at least in part on membership in a directory service group, the instructions including further instructions to cause the system to perform:
    automatically add the first entity to the directory service group based at least in part on the indicator, and grant the first entity the access to the first restricted resource based at least in part on being a member of the directory service group; and
    automatically remove the first entity from the directory service group based at least in part on the indicator, and deny the first entity the access to the first restricted resource after the removing the first entity from the directory service group.

16. The system of claim 10, in which one or more network interconnects a virtual private cloud (VPC) hosting the restricted resources, a cloud service hosting a directory service, and a chat system, the instructions including further instructions to cause the system to perform:
    provide the message to the chat system; and
    receive, responsive to the provide the message, data from the cloud service data indicating at least whether the requestor is authorized to make the ad hoc request.

17. A computer readable memory having instructions stored thereon for revoking access to restricted resources based at least in part on selected ones of an indicator stored with an access resource or an ad hoc request from a requestor, the restricted resources include a first restricted resource and a second restricted resource, the instructions that, in response to execution by a processor, are operable to perform operations including:
    periodically retrieve the indicator from the access resource, the indicator at least identifying a first entity having an associated on call status;
    automatically determine an access for the first entity to the first restricted resource based at least in part on the indicator;
    receive the ad hoc request to authorize a second entity with access to the second restricted resource for a time period;
    determine if the requestor is authorized to make the ad hoc request, and if so, grant the second entity access to the second restricted resource;
    send a message corresponding to the ad hoc request from the requestor; and
    automatically de-authorize the first entity based at least in part on the indicator, and de-authorize the second entity based at least in part on the time period.

18. The memory of claim 17, the instructions including further instructions that, in response to execution by a processor, are operable to perform:
    determine the indicator fails to identify the first entity with an on call status;
    determine an expiration of the time period;
    determine a frequency of receiving ad hoc requests associated with one or more of the requestor and the second entity;
    compare the frequency of receiving ad hoc requests with a request limit,
    verify compliance with the request limit; and
    determine the requestor is unauthorized to make the ad hoc request based at least in part on a noncompliance with the request limit.

19. The memory of claim 17, in which a group messaging platform may distribute messages having an associated topic, the instructions including further instructions that, in response to execution by a processor, are operable to perform:
    provide the message to the messaging platform with an associated topic corresponding to the ad hoc request.

20. The memory of claim 17, in which one or more datapath connects a virtual private cloud (VPC), a cloud service, a chat system, and a cloud system, the instructions including further instructions to cause the system to perform:
    receive from the VPC data corresponding to the restricted resources;
    receive from the cloud service data corresponding to a directory service controlling access to the restricted resources based at least in part on membership in a directory service group;
    automatically add the first entity to the directory service group based at least in part on the indicator, and grant the first entity the access to the first restricted resource based at least in part on being a member of the directory service group;
    automatically remove the first entity from the directory service group based at least in part on the indicator, and deny the first entity the access to the first restricted resource after the removing the first entity from the directory service group;
    provide the message to the chat system; and
    receive, responsive to the provide the message, data from the cloud service data indicating at least whether the requestor is authorized to make the ad hoc request.

* * * * *